United States Patent Office 3,302,164
Patented Jan. 31, 1967

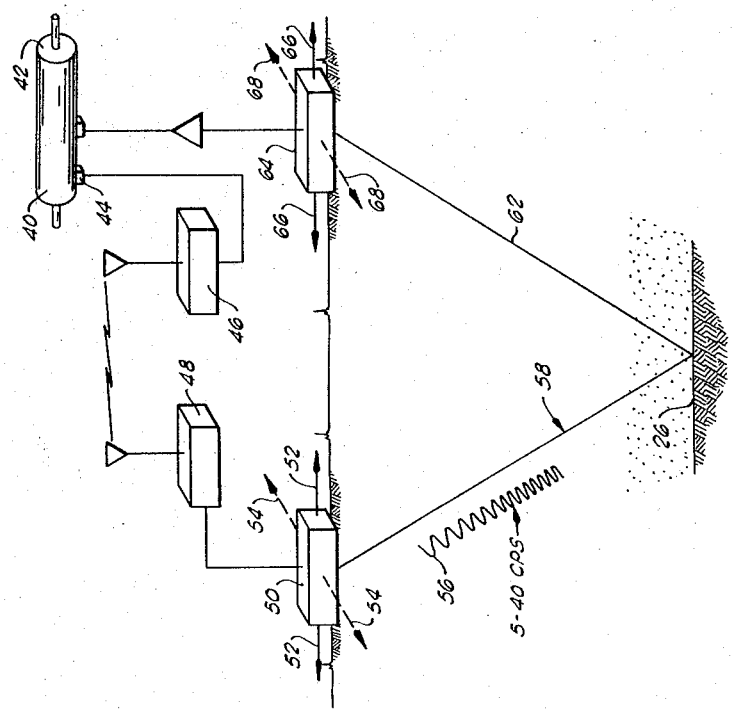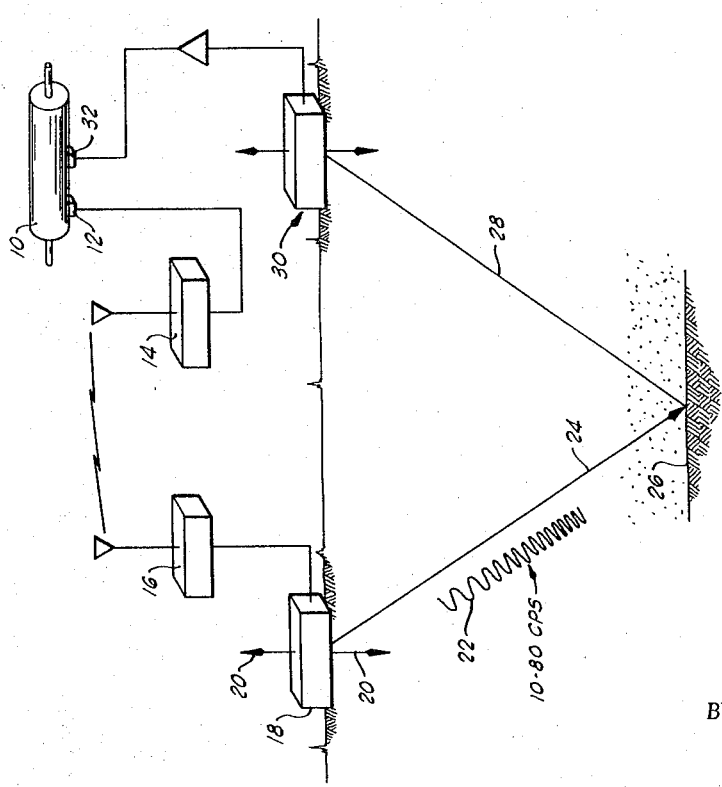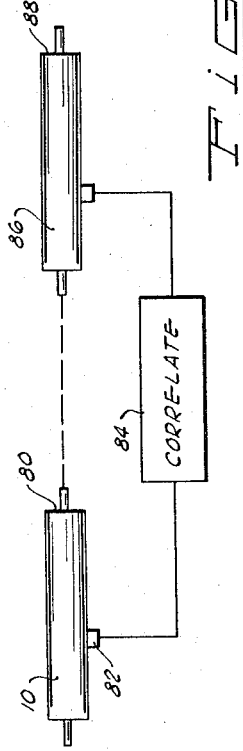

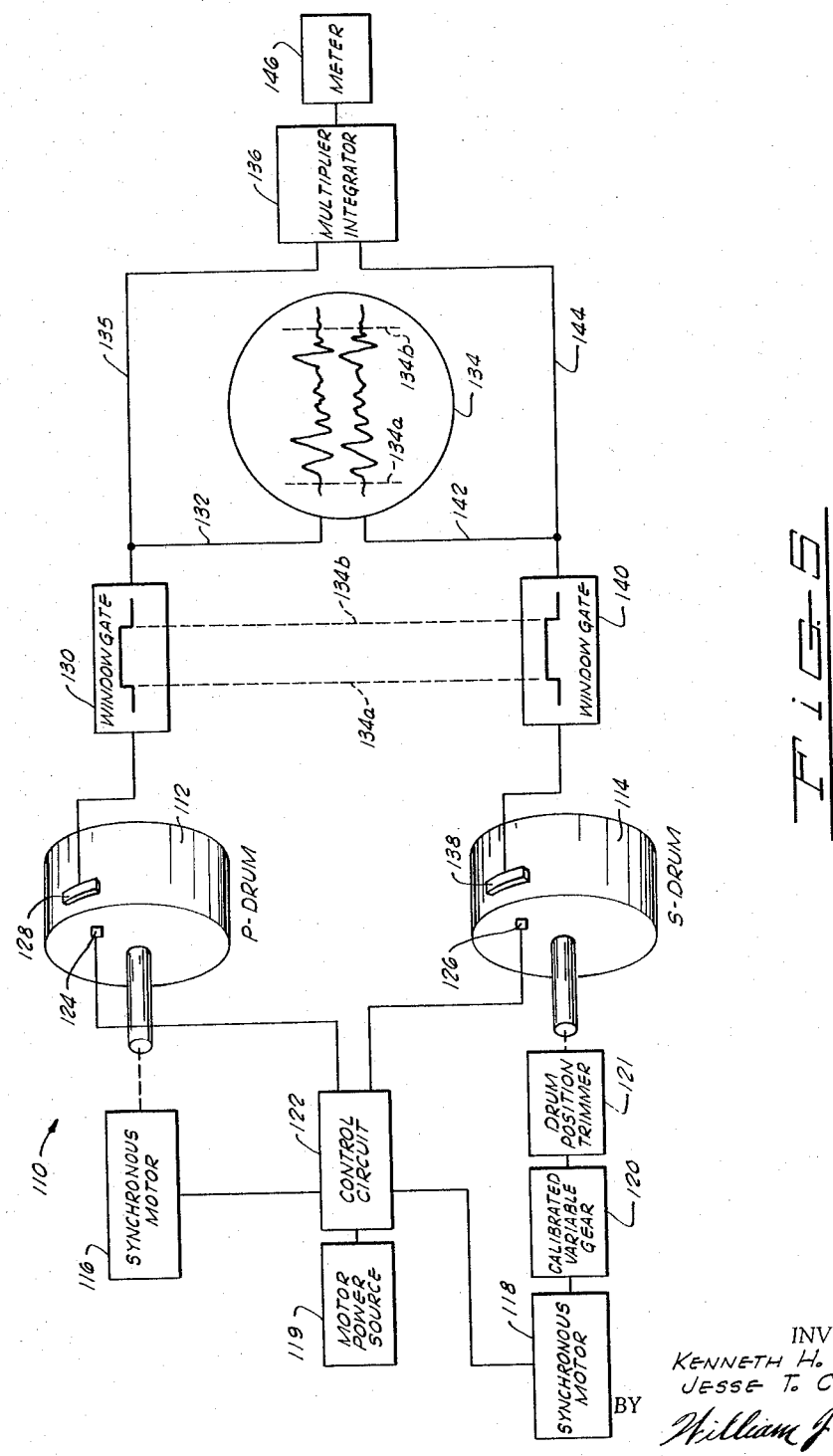

3,302,164
METHOD AND APPARATUS FOR GEOPHYSICAL PROSPECTING WHICH UTILIZES BOTH REFLECTED SHEAR AND PRESSURE WAVES
Kenneth H. Waters, Ponca City, Okla., and Jesse T. Cherry, Castro Valley, Calif., assignors to Continental Oil Company, Ponca City, Okla., a corporation of Delaware
Filed Dec. 12, 1963, Ser. No. 330,055
7 Claims. (Cl. 340—15.5)

The present invention relates to geophysical prospecting, and more particularly, but not by way of limitation, relates to a method utilizing seismic techniques for determining various physical characteristics of the earth and to a novel apparatus for performing certain aspects of the method.

There are two general types of seismic waves which are reflected at subterranean impedance interfaces in such a manner as to be detectable at the surface for seismographic purposes. One is the so-called pressure wave which is also sometimes referred to as a compression or longitudinal wave because the earth particle motion is in the direction of wave propagation. This type of wave motion is of course detected by a geophone which is sensitive to the longitudinal particle motion. The other is the shear wave, so called because it results from particle motion generally normal to the direction of wave propagation. In addition, when the particle motion is oriented normal to the incidence plane, which is defined as the vertical plane passing through both the surface point of origin and surface point of detection of the waves, the shear waves are defined as horizontal shear waves, and when the particle motion is oriented within the incidence plane, the waves are defined as vertical shear waves. These waves are of course detected by geophones oriented so as to be sensitive to particle motion either normal to the incidence plane or within the incidence plane, respectively.

The present invention is related to the use of both pressure wave seismic energy and shear wave seismic energy, and in particular to the use of the different characteristics of the two types of waves. In general, the average velocity of a shear wave through the earth is approximately one-half the velocity of pressure waves. However, the ratio of velocities between the two types of seismic energy waves will vary over a considerable range dependent upon the particular material through which the waves propagate and is, in nearly all cases, directly related to the Poisson's ratio for the material. The reflection of shear waves is controlled by the shear modulus of elasticity and density of the matrix while the reflection of pressure waves is controlled by the bulk modulus and density of the matrix. Fluid saturation of a sand, as when petroleum products are present, has little effect on the shear modulus of elasticity, but has a significant effect on the bulk modulus of elasticity, so that differences in shear wave and pressure wave records will normally occur. The present invention is concerned with obtaining and using seismic shear wave and pressure wave data which can be compared for various purposes.

Therefore the present invention contemplates the production of equivalent wave length spectrum pressure wave and shear wave seismograms of a particular portion of the earth and the comparison of these seismograms in order to determine the physical character of the various layers of the earth. In particular, the present invention contemplates a method for determining the ratio between the average velocity of shear waves and the average velocity of pressure waves over a particular zone in order to determine some aspects of the physical character of the formations within that zone, as well as to determine the presence of fluids by reason of differences in the two seismograms of a particular lithological feature. The present invention also contemplates a novel apparatus for determining the ratio between the shear wave velocity and the pressure wave velocity.

Therefore, an important object of the present invention is to provide a method for determining various physical properties of the earth by a comparison of a shear wave seismogram with a pressure wave seismogram.

Another object of the present invention is to provide an apparatus for performing certain aspects of the method of the present invention.

Yet another object of the present invention is to provide a method for determining the ratio of the shear wave velocity to the pressure wave velocity of a particular interval of depth and therefore of determining the Poisson's ratio for the interval of depth.

Another object of the present invention is to provide a method for determining the presence of fluid within a subterranean formation.

Many additional objects and advantages of the present invention will be evident to those skilled in the art from the following detailed description and drawings, wherein:

FIGS. 1 and 2 are schematic drawings illustrating a preferred method for obtaining seismic shear wave reflection data and seismic pressure wave reflection data, respectively;

FIG. 3 is a schematic block diagram illustrating a method for processing the seismic pressure wave and shear wave data to obtain equivalent wave length spectrum seismograms in accordance with the present invention;

FIG. 5 is a schematic diagram of an apparatus constructed in accordance with the present invention for measuring the ratio between the shear wave velocity and the pressure wave velocity; and, FIG. 6 is a schematic diagram of the electrical circuit of the apparatus of FIG. 5.

Figure 6:
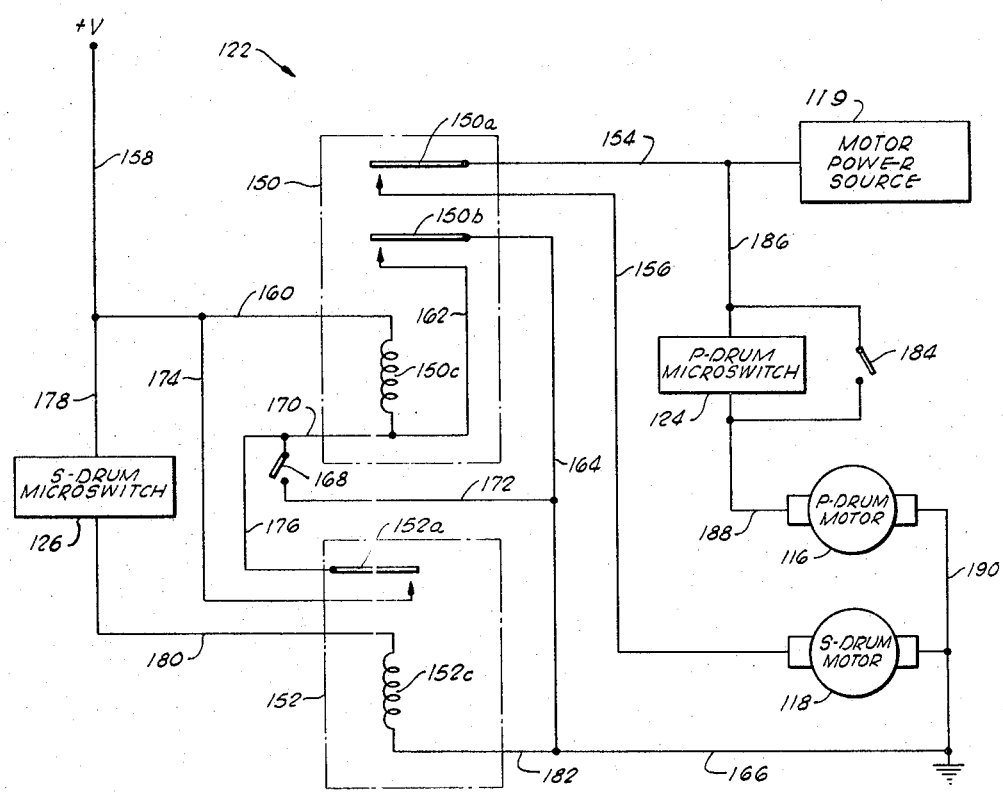

In its broader aspects, the method of the present invention entails producing approximately equivalent shear wave and pressure wave reflection data recorded with respect to elapsed time, and then comparing the corresponding time zones and seismic events of the seismograms in order to obtain various information. In general, this type of data is referred to in the art as a seismogram and will be so designated in this specification and the appended claims. However, the term "seismogram" as herein used is not to be limited to the preferred type disclosed but is intended, in the broader aspects of the invention, to include any seismic reflection data presentation with respect to time which reveals changes in lithology. In particular, the seismograms are compared in order to determine the ratio between the velocity of the shear waves over a particular depth interval and the velocity of the pressure waves over the same interval, and may further be used to determine the probable presence of fluids in situations where a seismic event occurs or is appreciably different in size and/or character on either the shear wave data or the pressure wave data.

When seismic energy, either pressure waves or shear waves, propagates downwardly and is reflected by various interfaces, the reflections detected and recorded at the surface produce, after the necessary processing, various characteristic shapes known as seismic "events." The spacing between the seismic events is determined by the velocity of the seismic energy through the various formations, and the total elapsed time is a measure of the average velocity of the lithology above the interface. In general, the average ratio of the shear wave velocity $V_s$ to the pressure wave velocity $V_p$ is approximately 0.5, although as will hereafter be pointed out in greater detail this ratio varies considerably and is the ratio which is to be measured in accordance with one important aspect of the present invention.

In order to effectively compart the shear wave seismogram with the pressure wave seismogram, so that the desired information can be obtained, it is necessary that the two seismograms be of substantially the same reflection content or character. Since the velocity of pressure waves is approximately twice as fast as the velocity of shear waves through the average formation, it can be expected that the endurance time of a shear wave seismogram will be approximately twice as long as that of a corresponding pressure wave seismogram. The shape, amplitude and presence of seismic events in either type of seismogram is to a large degree determined by the wave length of the seismic energy due to the fact that the vertical spacings between the reflecting interfaces results in reinforcement and attenuation of the various wave length components of the seismic energy. For this reason, the earth is said to be sensitive to wave lengths of seismic energy. Since wave lengths are directly related to frequencies, if the effective frequency spectrum of two seismograms, whether two shear wave seismograms or two pressure wave seismograms, is different, the relative position and character of corresponding events will vary appreciably. This holds true whether comparing two pressure wave seismograms, two shear wave seismograms, or a shear wave seismogram and a pressure wave seismogram. Therefore, in order to effectively compare a shear wave seismogram with a pressure wave seismogram, the wave length spectrum of the shear wave seismogram should be approximately one-half the wave length spectrum of the pressure wave seismogram. This means that each of the frequency components of the shear wave seismogram should have a value approximately one-half one of the frequency components of the pressure wave seismogram because of the fact that the average ratio between the shear wave velocity and pressure wave velocity is 0.5. Thus if the frequency spectrum of the pressure wave seismogram is 10–80 c.p.s., the frequency spectrum of the shear wave seismogram should be 5–40 c.p.s. Of course this relationship should vary in the event the average shear wave velocity to pressure wave velocity ratio $V_s/V_p$ in the zone of interest is other than 0.5. For example, in order to obtain the best comparison results, if the velocity ratio $V_s/V_p$ is 0.6 and the frequency spectrum of the pressure wave seismogram is 10–80 c.p.s., then the frequency spectrum of the shear wave seismogram should preferably be 6–48 c.p.s. However, as a practical matter, a frequency spectrum ratio of 0.5 is adequate in most cases to produce substantially equal wave length spectrums for the two seismograms.

The method which can be used to produce wave length equivalent shear wave and pressure wave seismograms is schematically disclosed in FIGS. 1 and 2, although it is to be understood that other methods can be used for producing the seismograms and that different data presentation can be used without departing from the spirit and scope of the present invention.

Referring to FIG. 1, a sweep signal, for example from 10–80 c.p.s., of several second duration is recorded on a record sheet 10 disposed on a rotating drum. The sweep signal is reproduced by a head 12 and transmitted by a transmitter 14 to a remotely located receiver 16 mounted on a truck carrying a seismic transducer 18. The transducer 18 is reciprocated in the vertical direction as indicated by the arrows 20 in relatively precise synchronism with the sweep signal. A seismic energy sweep signal 22 propagates downwardly along a path 24 and is reflected from an interface 26 along a path 28 to a geophone 30. The geophone 30 is oriented to detect the vertical component of particle motion which is amplified and recorded by a head 32 on another recording track of the record sheet 10 as the drum continues to rotate. Thus the seismic sweep signal 22 is reflected from each impedance interface and recorded on the record sheet 10 such that the various reflections from the many interfaces will overlap to produce a composite signal which may be correlated against the sweep signal, as will presently be described, in order to produce the desired seismogram.

The shear wave data should be obtained by using substantially the same techniques. Therefore, a sweep signal recorded on a record sheet 40 disposed on a drum 42 is reproduced by a head 44 and transmitted by a transmitter 46 to a receiver 48 disposed on a remotely located truck carrying a shear wave transducer 50. The transducer 50 has a member which is coupled to the earth and which reciprocates either in the direction of the arrows 52 or in the direction of the arrows 54. When reciprocated in the direction of the arrows 52, so-called vertical shear waves are generated, and when reciprocated in the direction of the arrows 54, horizontal shear waves are generated, as will presently be described. The sweep signal used to control the shear wave transducer should have upper and lower limits which are approxicately one-half the upper and lower limits of the sweep signal used to control the pressure wave transducer so as to produce the desired wave length spectrum as previously discussed. Of course, this relative value between the shear wave sweep signal and pressure wave sweep signal is based upon the velocity ratio between the shear wave and pressure wave seismic energy, and in areas where the average velocity ratio is substantially different from 0.5, the upper and lower limits of the sweep signal should be adjusted accordingly.

Upon reciprocation of the transducer 50 in synchronism with the sweep signal, a seismic sweep signal 56 is induced in the earth along a path 58 to the interface 26 and is reflected along the path 62 to a shear wave sensitive geophone 64. The geophone 64 is of course oriented to be sensitive to whichever component of shear wave motion was induced in the earth. For example, if the transducer 50 was reciprocated on the lines 52, the geophone 64 should be oriented to detect particle motion along the arrows 66. In this case, so-called vertical shear waves would be detected because the particle motion lies within the plane of incidence which, as previously noted, is defined as the vertical plane passing through both the transducer and geophones. If the transducer 50 is reciprocated in the direction of the dotted arrows 54, then the geophone 64 should be oriented to sense particle motion in the direction of the dotted arrows 68. In this case, so-called horizontal shear wave energy would be detected since the particle motion is normal to the plane of incidence.

Two important factors should be recognized in connection with the seismic shear wave energy in relation to the seismic pressure wave energy. First, each frequency component of the seismic shear wave sweep signal 56 has a corresponding wave length in the seismic pressure wave sweep signal 22 even though each of the corresponding frequency components of the shear wave energy is approximately one-half that of the corresponding frequency component of the pressure wave energy. Also, due to the fact that the velocity of the shear wave energy is one-half the velocity of the pressure wave energy, the total time required for the seismic sweep signal 56 to propagate downwardly to the interface 26, for example, and be reflected to the surface will be approximately twice the time required for the pressure wave energy. Again it will be appreciated that the relative total times will be inversely proportional to the ratio between the average velocity of the seismic shear wave energy and the velocity of the pressure wave energy.

After the pressure wave and shear wave reflection data is recorded with respect to time on the record sheets 10 and 40, the complex seismic reflection signals are correlated with the respective sweep signals as illustrated schematically in FIG. 3. Although the record sheet 10 is illustrated in FIG. 3, it is to be understood that the shear wave data recorded on the record sheet 40 would be processed in substantially the same manner. The record sheet 10 is disposed on a reproducing drum 80 and the complex reflection data recorded thereon by the head 32 is reproduced by a head 82. The reproduced data is then correlated with the sweep signal originally used to control the operation of the transducer 18 by an apparatus represented by the block 84. The correlation apparatus 84 is preferably of the type described in U.S. application Serial No. 192,669 which employs an electrical conductor having a shape corresponding substantially to the wave shape of the correlation sweep signal. The conductor is disposed adjacent to a magnetic track upon which the complex data signal is recorded and as the magnetic record track passes the conductor, a correlation signal is induced in the conductor which is recorded upon an appropriate record sheet 86 disposed upon a drum 88 which is connected to and moved in synchronism with the drum 80. The correlation signal then constitutes an impulse equivalent seismogram having a frequency and width equal to that defined by the upper and lower limits of the sweep signal and a corresponding wave length spectrum.

Although the correlation step is all the processing required for the complex reflection data, further refinement can be obtained by compositing a plurality of separately recorded signals prior to correlation in order to increase the signal-to-noise ratio, and by normalizing the correlated signal to reduce the adverse effects caused by the earth in attenuating various frequency components of the transmitted seismic energy. Both of these methods are described in the above referenced copending application. Of course it will be appreciated by those skilled in the art that the effective frequency band width or wave length spectrum of the seismogram can be reduced by the reflection data processing procedures or by inadequacies of the system. The shear wave seismic data recorded on the record sheet 40 is processed in the same manner to produce an impulse equivalent shear wave seismogram having a substantially equivalent wave length spectrum.

Due to the fact that the shear wave seismogram will normally be approximately twice the length of the pressure wave seismogram if the same time scale is used, the shear wave seismogram is preferably compressed to a time scale that is one-half the time scale of the pressure wave seismogram. For example, referring to FIG. 4, a shear wave seismogram 100 has a time scale 102 which is one-half the time scale 104 of the pressure wave seismogram 106. Then when the two seismograms are time oriented, as illustrated, the corresponding seismic events will be sufficiently aligned to permit ready identification. For example, the events 100a and 106a evidently correspond, the event 100b corresponds with the event 106b, and the event 100c corresponds with the event 106c. In some cases, the pronounced difference in two corresponding seismic events, such as 106d and 100d, will indicate the presence of fluid because of the fact that fluid saturation of a sand has very little effect upon the shear wave velocity while it has a marked effect upon the pressure wave velocity. For example, if a shale having a pressure wave velocity of 11,000 feet per second overlies a sand which when not fluid saturated has a pressure wave velocity of 14,000 feet per second but when saturated has a pressure wave velocity of 10,000 feet per second, a very slight reflection indication or seismic event would occur when the sand is saturated. On the other hand, if the shale has a shear wave velocity of 5,500 feet per second and the sand has a shear wave velocity of 7,000 feet per second whether saturated or not, a relatively large seismic event would normally be produced and the difference in character of the two corresponding events would be an indication of the presence of fluid. Of course it will be appreciated that the particular effect upon the corresponding values will depend entirely upon the relative velocities of the adjacent beds and that in some instances the event may occur on the pressure wave seismogram rather than on the shear wave seismogram, or the differences in the events may merely be one of magnitude.

Figure 4:
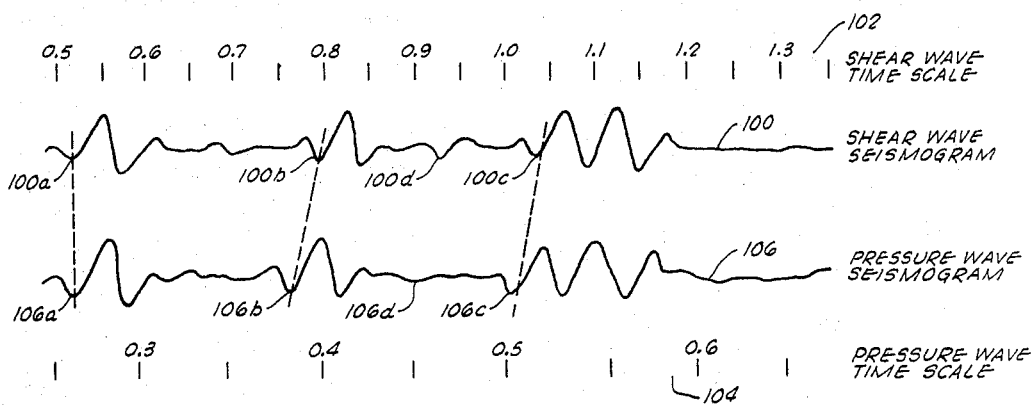
FIG. 4 is a schematic drawing which assists in describing the method of the present invention.

With the shear wave seismogram reduced to one-half scale, as illustrated in FIG. 4, the velocity ratio $V_s/V_p$ where $V_s$ is the velocity of the shear wave and $V_p$ is the velocity of the pressure wave, for any lithological interval can be easily computed. For example, the time required for the shear waves to traverse the lithological interval between events 100a and 100b would be approximately 0.27 seconds, while the time required for the pressure waves to traverse the same lithological interval between 106a and 106b would be approximately 0.11 second, and the velocity ratio would be 0.42. The velocity ratio can be computed for any other distinguishable lithological interval in substantially the same manner.

Referring now to FIGS. 5 and 6, an apparatus for computing the velocity ratio $V_s/V_p$ is indicated generally by the reference numeral 110. The device 110 comprises, in general, a P-drum 112 upon which the pressure wave seismogram can be magnetically recorded, and a S-drum 114 upon which the shear wave seismogram can be recorded. The P-drum 112 is driven by a synchronous motor 116. A synchronous motor 118 drives the S-drum 114 by means of a calibrated variable gear 120 for varying the relative speed between the P-drum 112 and S-drum 114 and a drum position trimmer 121 for varying the relative positions of the drums when at the reference position and therefore the relative positions at any point of travel. The synchronous motors 116 and 118 are powered by a common alternating current power source 119. The operation of the synchronous motors 116 and 118, and therefore drums 112 and 114, is governed by a control circuit 122 which is illustrated schematically in FIG. 6, and which will presently be described in detail.

A P-drum microswitch 124 is positioned adjacent the P-drum 112 and an S-drum microswitch 126 is positioned adjacent the S-drum 114 for actuation at certain points in the rotation of the respective drums, as will hereafter be described. A reproducing head 128 is disposed adjacent to the P-drum 112 for reproducing the seismogram recorded thereon. The reproduced seismogram is passed through a window gate 130 of the type conventionally used in connection with an oscilloscope and is applied by a lead 132 to one channel of a dual trace oscilloscope 134 and by a lead 135 to a multiplier-integrator 136. A reproducing head 138 is operatively positioned adjacent to S-drum 114 to reproduce the seismogram recorded on the surface of the drum. The reproduced seismogram is passed through a window gate 140 like the window gate 130 and is applied by a lead 142 to the other channel of the dual trace oscilloscope 134. The multiplier-integrator 136 multiplies the instantaneous time values of the seismogram signals passed through the window gates 130 and 140 and integrates the product of the two signals over the time period passed through the window gates to produce a total value which is indicated by the meter 146.

Referring now to FIG. 6, the control circuit 122 comprises a relay 150 having a first, normally open switchblade 150a which connects the motor power source 119 to the S-drum motor 118 through leads 154 and 156 when closed. A second, normally open switchblade 150b of the relay 150 is connected in a holding circuit for the coil 150c of the relay 150 comprising the leads 158 and 160 to the coil 150c, and leads 162, 164 and 166 to ground. A start switch 168 provides a means for momentarily energizing the coil 150c to close the holding circuit switchblade 150b and is connected in shunt around the switchblade 150b by the leads 170 and 172. The switchblade 152a of a second relay 152 is connected in shunt around the coil 150c by the leads 174 and 176 to provide a means for deenergizing the coil 150c. The coil 152c is energized by closing of the microswitch 126 to complete a circuit from the lead 158 through leads 178, 180, 182 and 166 to ground. The P-drum drive motor 116 is energized from the motor power source 119 by a starter switch 184 which is connected in shunt around the microswitch 124 and two leads 186 and 188. The circuit through the P-drum drive motor 116 is completed by the lead 190 to ground.

The P-drum microswitch 124 is normally closed except when biased open by a cam oriented to open the microswitch and stop the P-drum at a zero reference point. As soon as the start switch 184 is momentarily closed and the motor 116 moves the P-drum, the P-drum microswitch 124 closes and remains closed until the P-drum 112 completes one revolution. The S-drum microswitch 126, on the other hand, is preferably open except when the S-drum 114 is at the zero reference point, at which time it is closed. Thus as soon as the starter switch 168 is closed to actuate the relay 150 and energize the S-drum motor 118, the S-drum microswitch 126 opens and remains open until the drum has completed one revolution before again closing and energizing the coil 152c to shunt out the coil 150c and deenergize the S-drum motor 118.

When using the apparatus 110 to measure the velocity ratio $V_s/V_p$, the shear wave seismogram is recorded on the S-drum 114 and the pressure wave seismogram is recorded on the P-drum 112, care being taken to maintain a zero reference point or datum point on each oriented with respect to the zero or reference point of the two drums. In this respect, the microswitches 124 and 126 may conveniently be adjustable so as to cause the two drums to start and stop at the zero time point of the seismograms. The apparatus is then operated by simultaneously closing the start switches 168 and 184 to simultaneously start operation of the P-drum motor 116 and S-drum motor 118. When the switch 184 is momentarily closed, the P-drum 112 will rotate sufficiently far to permit the P-drum microswitch 124 to close and continue operation of the drum. The switch 184 is preferably spring biased and returns to the open position. When the start switch 168 is closed, a circuit is momentarily completed through the coil 150c to close the switchblade 150a and actuate the S-drum motor 118. The S-drum microswitch 126 then opens as the drum turns. The other contact 150b of the relay 150 serves as a holding circuit to maintain the coil 150c energized during the continued rotation of the S-drum 114.

When the S-drum 114 has completed one revolution, the S-drum microswitch 126 is closed to energize the coil 152c which closes the switchblade 152a and shunts the coil 150c to open the switchblade 150a and denergize the S-drum motor 118. Deenergization of the coil 150c also opens the holding circuit switch 150b. Therefore, after one revolution, both the P-drum 112 and S-drum 114 are stopped at the zero reference point until such time as the start switches 168 and 184 are again energized. This procedure is repeated until the following adjustments are completed.

The calibrated variable gear 120 is initially set to cause the S-drum 114 to operate at twice the speed of the P-drum 112 so that the two seismograms displayed on the oscilloscope 134 will have approximately the same time scale, as previously discussed in connection with FIG. 4. The window gates 130 and 140 are then opened sufficiently wide to display substantially the entire seismograms so that the lithological feature for which the velocity ratio $V_s/V_p$ is to be computed can be located. Then the window gate 130 is narrowed down and so positioned that the first seismic event on the pressure wave seismogram defining the upper boundary of the lithological feature is oriented approximately at the left-hand edge of the window gate, represented by the dotted line 134a of the oscilloscope 134, and the seismic event defining the other side of the lithological feature is aligned approximtaely with the other end of the window gate, represented by the dotted line 134b. Then the drum position trimmer 121 and calibrated variable gear 120 are adjusted until the corresponding seismic events on the shear wave seismogram defining the lithological feature are also approximately aligned with the boundaries of the window gates 134a and 134b. As will presently be evident, precise alignment of the events with the boundaries of the window gate is not important, because the computation of the velocity ratio is derived from the relative rotation speeds of the P-drum and S-drum as determined by the setting of the calibrated variable gear 120.

The multiplying integrator 136 is also simultaneously receiving the portions of the seismograms passed through the window gates 130 and 140 and provides a measure of the degree of coincidence between those portions of the seismograms, which degree of coincidence is indicated by the meter 146. Therefore, the calibrated variable gear 120 and drum position trimmer 121 are adjusted until a maximum reading on the meter 146 is attained, which maximum reading will be an indication that the portions of the seismograms passed through the window gates are in a state of maximum alignment. Then the calibrated variable gear 120 is read to directly indicate the velocity ratio $V_s/V_p$ for the lithological feature of interest. It will be appreciated that the lithological feature of interest may include a subtantial depth of varying velocities, in which case the ratio will be that of the average velocity over the interval displayed. It will also be appreciated that the average velocity reading is derived from the relative speeds of the S-drum and P-drum. The drum position trimmer 121 is also preferably calibrated to provide a reading which taken in conjunction with the reading of the calibrated variable gear 120 will give the average velocity ratio from the zero reference point down to the first seismic events defining the upper limits of the lithological feature of interest.

From the above detailed description, it will be evident that a highly novel and useful method has been described for producing a pressure wave seismogram and a shear wave seismogram which can be compared due to the fact that the effective wave length spectrums of the two are susbtantially equal. Further, a method for computing the ratio between the shear wave velocity and the pressure wave velocity for any lithological interval has been described. Also, a method for detecting the presence of fluid in a formation has been described. The seismograms which have substantially the same wave length spectrums may also be compared for various other useful purposes which will be evident to those skilled in the art. Although a particular preferred method for producing the pressure wave and shear wave seismograms having substantially equivalent wave length spectrums has been described, it will be appreciated that the invention in its broader aspects includes the production of such seismograms by any other means. Further, the particular display of the seismograms illustrated can be varied so long as the various lithological features can be identified as corresponding features on the two seismograms and the relative time intervals between the features are presented. A novel apparatus has also been disclosed for measuring the ratio of the shear wave velocity to pressure wave velocity. It will also be evident to those skilled in the art that this measurement can be made using a digital computer. Of course it will be appreciated that the velocity ratio may be expressed either as $V_s/V_p$ or $V_p/V_s$.

Although several preferred embodiments of the present invention have been described in detail, it is to be understood that various changes, substitutions and alterations can be made in the steps and combination of steps and in the parts and combination of parts herein disclosed

What is claimed is:

1. A method for determining physical properties of subterranean layers of the earth comprising the steps of:
producing seismic pressure wave reflection data of the subterranean layer recorded with respect to time and having an effective wave length spectrum;
producing seismic shear wave reflection data of the subterranean layer recorded with respect to time and having an effective wave length spectrum substantially the same as the effective wave length spectrum of the pressure wave reflection data; and
comparing the seismic pressure wave reflection data with the seismic shear wave reflection data.

2. A method for determining physical properties of subterranean layers of the earth comprising the steps of:
producing seismic pressure wave reflection data of the subterranean layer recorded with respect to time and having an effective wave length spectrum;
producing seismic shear wave reflection data of the subterranean layer recorded with respect to time and having an effective wave length spectrum substantially the same as the effective wave length spectrum of the pressure wave reflection data; and,
computing the ratio between the velocity of seismic shear waves through a layer and the velocity of seismic pressure waves through the layer.

3. A method for determining physical properties of subterranean layers of the earth comprising the steps of:
producing seismic pressure wave reflection data of the subterranean layer with respect to time having an effective frequency band with upper and lower frequency limits;
producing seismic shear wave reflection data of the subterranean layer with respect to time having an effective frequency band with upper and lower frequency limits approximately equal to one-half the upper and lower frequency limits of the pressure wave reflection data, respectively; reproducing said seismic shear wave reflection data on a time scale which is changed by a factor equal to the ratio of average shear wave velocity to average pressure wave velocity; and
comparing the pressure wave reflection data and the reproduced shear wave reflection data with both sets of data having the same apparent frequency limits.

4. A method for determining physical properties of subterranean layers of the earth comprising the steps of:
producing seismic pressure wave reflection data of the subterranean layer with respect to time having an effective frequency band with upper and lower frequency limits;
producing seismic shear wave reflection data of the subterranean layer with respect to time having an effective frequency band with upper and lower frequency limits approximately equal to one-half the upper and lower frequency limits of the pressure wave reflection data, respectively; and,
computing the ratio between the velocity of seismic shear waves through a layer and the velocity of seismic pressure waves through the layer by determining the differential in time scale between the pressure wave and shear wave reflection data at which a series of seismic events indicative of said layer show maximum coincidence.

5. A method for determining physical properties of subterranean layers of the earth comprising the steps of:
inducing a seismic pressure wave sweep signal in the earth having upper and lower cutoff frequencies;
detecting and recording the seismic pressure wave reflections with respect to time to produce a complex pressure wave signal;
correlating the complex pressure wave signal with the pressure wave sweep signal to produce an impulse equivalent pressure wave seismogram having an effective wave length spectrum;
inducing a seismic shear wave sweep signal in the earth having upper and lower cutoff frequencies equal to approximately one-half the upper and lower cutoff frequencies, respectively, of the pressure wave sweep signal;
detecting and recording the seismic shear wave reflections with respect to time to produce a complex shear wave signal;
correlating the complex shear wave signal with the shear wave sweep signal to produce an impulse equivalent shear wave seismogram having an effective wave length spectrum approximately equal to the effective wave length spectrum of the pressure wave seismogram; and,
comparing the pressure wave seismogram and the shear wave seismogram.

6. A method for determining physical properties of subterranean layers of the earth comprising the steps of:
inducing a seismic pressure wave sweep signal in the earth having upper and lower cutoff frequencies;
detecting and recording the seismic pressure wave reflections with respect to time to produce a complex pressure wave signal;
correlating the complex pressure wave signal with the pressure wave sweep signal to produce an impulse equivalent pressure wave seismogram having an effective wave length spectrum;
inducing a seismic shear wave sweep signal in the earth having upper and lower cutoff frequencies equal to approximately one-half the upper and lower cutoff frequencies, respectively, of the pressure wave sweep signal;
detecting and recording the seismic shear wave reflections with respect to time to produce a complex shear wave signal;
correlating the complex shear wave signal with the shear wave sweep signal to produce an impulse equivalent shear wave seismogram having an effective wave length spectrum approximately equal to effective wave length spectrum of the pressure wave seismogram; and,
computing the ratio between the velocity of seismic shear waves through a layer and the velocity of seismic pressure waves through the layer.

7. Apparatus for computing the ratio between the velocity of seismic shear waves through a vertical section of the earth and the velocity of seismic pressure waves through the vertical section comprising:
P-drum means having a magnetic record surface upon which seismic pressure wave reflection data can be recorded;
S-drum means having a magnetic record surface upon which seismic shear wave reflection data can be recorded;
drive means connected to said drum means for rotating the P-drum means and S-drum means in synchronism;
calibrated means interconnected between said drive means and one of said drum means for varying the speed of rotation of one of the drum means relative to the other;
means for energizing said drive means and simultaneously starting rotation of the P-drum means and S-drum means;
means connected to said drive means for stopping the P-drum means after one revolution;
means connected to said drive means for stopping the S-drum means after one revolution;
means interconnected between said drive means and one of said drum means for varying the position of one drum means relative to the other drum means when the drum means are stopped;

means for reproducing selectable intervals of the data recorded on the P-drum means as a time varying representation;

means for reproducing selectable intervals of the data recorded on the S-drum means as a time varying representation; and, means including indicator means combining said representation and enabling comparison for maximum coincidence, whereby the relative speeds of rotation, relative position and reproduced intervals can be varied to obtain maximum coincidence at which time the ratio of the speed of the S-drum to the speed of the P-drum will be proportional to the ratio of the average velocity of the seismic shear waves through the corresponding reproduced interval and the velocity of the seismic pressure waves through the corresponding reproduced interval.

References Cited by the Examiner
UNITED STATES PATENTS

| | | | |
|---|---|---|---|
| 2,658,578 | 11/1953 | Oliphant | 181—.5 |
| 2,989,726 | 6/1961 | Crawford et al. | 340—15.5 |
| 3,003,577 | 10/1961 | Itria | 181—.5 |
| 3,041,578 | 6/1962 | Elliott | 340—15.5 |
| 3,159,232 | 12/1964 | Fair | 181—.5 |
| 3,196,385 | 7/1965 | Smith | 340—15.5 |

BENJAMIN A. BORCHELT, *Primary Examiner.*

R. M. SKOLNIK, *Assistant Examiner.*